United States Patent
Amerling et al.

(10) Patent No.: US 10,464,648 B1
(45) Date of Patent: Nov. 5, 2019

(54) MARINE DRIVES HAVING SOUND BLOCKING MEMBER

(71) Applicant: Brunswick Corporation, Mettawa, IL (US)

(72) Inventors: Steven J. Amerling, Fond du Lac, WI (US); Bradley R. Stafford, Omro, WI (US); Rick R. Roth, Oakfield, WI (US)

(73) Assignee: Brunswick Corporation, Mettawa, IL (US)

( * ) Notice: Subject to any disclaimer, the term of this patent is extended or adjusted under 35 U.S.C. 154(b) by 112 days.

(21) Appl. No.: 15/922,386

(22) Filed: Mar. 15, 2018

(51) Int. Cl.
| | |
|---|---|
| *B63H 1/15* | (2006.01) |
| *B63H 20/06* | (2006.01) |
| *F16F 1/36* | (2006.01) |
| *F02M 35/16* | (2006.01) |
| *B63H 21/30* | (2006.01) |

(52) U.S. Cl.
CPC ........... *B63H 20/06* (2013.01); *B63H 21/305* (2013.01); *F02M 35/167* (2013.01); *F16F 1/36* (2013.01)

(58) Field of Classification Search
CPC .... B63H 20/02; B63H 20/06; B63H 2020/02; B63H 2020/025; B63H 21/30; B63H 21/305; B63H 2021/30; F02M 35/167; F16F 1/36
USPC ............................................. 440/52, 76, 77
See application file for complete search history.

(56) References Cited

U.S. PATENT DOCUMENTS

| | | | |
|---|---|---|---|
| 3,961,595 A | 6/1976 | Meyer | |
| 4,669,698 A | 6/1987 | McGuire | |
| 5,238,433 A | 8/1993 | Hayasaka et al. | |
| 5,355,821 A | 10/1994 | Johnson | |
| 5,707,263 A | 1/1998 | Eick et al. | |
| 6,146,220 A | 11/2000 | Alby et al. | |
| 6,419,534 B1 | 7/2002 | Helsel et al. | |
| 6,454,620 B1 | 9/2002 | Theisen et al. | |
| 6,656,003 B1 | 12/2003 | Kitsu et al. | |
| 6,848,411 B2 * | 2/2005 | Koyama ............... | F16F 15/265 123/184.57 |
| 7,244,152 B1 | 7/2007 | Uppgard | |
| 7,896,304 B1 | 3/2011 | Eichinger et al. | |
| 8,820,701 B1 | 9/2014 | Eichinger | |

(Continued)

OTHER PUBLICATIONS

Unpublished U.S. Appl. No. 15/410,879, filed Jan. 20, 2017.

(Continued)

*Primary Examiner* — Daniel V Venne
(74) *Attorney, Agent, or Firm* — Andrus Intellectual Property Law, LLP

(57) ABSTRACT

A marine drive has a propulsion unit, a supporting cradle, a resilient mount that couples the propulsion unit to the supporting cradle, a sound blocking member that extends across an internal gap between the propulsion unit and the supporting cradle, and a cowling system having upper and lower cowlings that cover at least a portion of the propulsion unit and lower cradle covers that cover at least a portion of the supporting cradle. The upper and lower cowlings are separated from the lower cradle covers by an external gap so that the upper and lower cowlings can move along with the propulsion unit and with respect to the supporting cradle and the cradle covers. The sound blocking member blocks the sound which otherwise would emanate from propulsion unit via the internal gap and then from the marine drive via the external gap.

20 Claims, 7 Drawing Sheets

(56) References Cited

U.S. PATENT DOCUMENTS

| | | |
|---|---|---|
| 9,205,906 B1 | 12/2015 | Eichinger |
| 9,302,756 B1 | 4/2016 | Groeschel et al. |
| 9,334,034 B1 | 5/2016 | Waldvogel et al. |
| 9,376,191 B1 | 6/2016 | Jaszewski |
| 9,446,828 B1 | 9/2016 | Groeschel et al. |
| 9,475,560 B1 | 10/2016 | Jaszewski et al. |
| 9,481,439 B1 | 11/2016 | Groeschel et al. |
| 9,623,948 B1 | 4/2017 | Waldvogel |
| 9,643,703 B1 | 5/2017 | Eichinger |
| 9,701,383 B1 | 7/2017 | Stuber et al. |
| 2004/0211383 A1* | 10/2004 | Koyama ............... F02B 61/045 123/192.2 |
| 2017/0314110 A1 | 11/2017 | Grassi |

OTHER PUBLICATIONS

Unpublished U.S. Appl. No. 15/410,893, filed Jan. 20, 2017.
Grassi et al., "The Ablation Casting Process," journal article, Apr. 17, 2009, vols. 618-619, pp. 591-594 of Materials Science Forum, Switzerland.
Shiomi et al., "Reducing Vibration of a 2-Cylinder Outboard Motor by the Pendulum Motion Mount Method," technical paper, Nov. 28-30, 2001, Small Engine Technology Conference and Exhibition, Pisa, Italy.
Waldvogel et al., "Stern Drives for Marine Vessels," Unpublished U.S. Appl. No. 14/714,418, filed May 18, 2015.

\* cited by examiner though the upper and lower cowlings can move along with the propulsion unit and with respect to the supporting cradle and the lower cradle covers. The sound blocking member blocks the sound which otherwise would emanate from propulsion unit via the internal gap and then from the marine drive via the external gap.

MARINE DRIVES HAVING SOUND BLOCKING MEMBER

FIELD

The present disclosure relates to marine drives, and in the illustrated example to an outboard motor having a rigid supporting cradle and movable propulsion unit.

BACKGROUND

The following U.S. patents are incorporated herein by reference:

U.S. Pat. No. 9,701,383 discloses a marine propulsion support system including a transom bracket assembly, a swivel bracket, and a mounting bracket. A drive unit is connected to the mounting bracket by a plurality of vibration isolation mounts, which are configured to absorb loads on the drive unit that do not exceed a mount design threshold. A bump stop located between the swivel bracket and the drive unit limits deflection of the drive unit caused by loads that exceed the threshold. An outboard motor includes a transom bracket assembly, a swivel bracket, a cradle, and a drive unit supported between first and second opposite arms of the cradle. First and second vibration isolation mounts connect the first and second cradle arms to the drive unit, respectively. An upper motion-limiting bump stop is located remotely from the vibration isolation mounts and between the swivel bracket and the drive unit.

U.S. Pat. No. 9,643,703 discloses an arrangement for coupling a vibration isolation mount to an outboard motor. A pocket is formed in a midsection housing of the outboard motor and defines a first concave surface. A cover is configured to be mounted to the midsection housing over the pocket via a plurality of fasteners. The cover defines a second, oppositely concave surface on an inner face thereof. When the cover is mounted to the midsection housing over the pocket, the first concave surface and the second concave surface together form a cavity there between for holding a vibration isolation mount therein. One of the first concave surface and the second concave surface has a protrusion that extends into the cavity and contacts the mount held therein upon tightening of the plurality of fasteners to hold the cover over mount in the pocket. A mounting arrangement is also provided.

U.S. Pat. No. 9,475,560 discloses an outboard motor including an internal combustion engine, and an adapter plate having an upper end that supports the engine and a lower end formed as a cylindrical neck. A driveshaft housing below the adapter plate has an integral oil sump collecting oil that drains from the engine and through the adapter plate neck. One or more bearings couple the adapter plate neck to the oil sump such that the driveshaft housing is suspended from and rotatable with respect to the adapter plate. A driveshaft is coupled to a crankshaft of the engine, and extends along a driveshaft axis through the adapter plate neck, bearing(s), and oil sump. A steering actuator is coupled to and rotates the oil sump, and thus the driveshaft housing, around the driveshaft axis with respect to the adapter plate, which varies a direction of the outboard motor's thrust.

U.S. Pat. No. 9,376,191 discloses an outboard motor coupled to a transom of a marine vessel and including a midsection housing having a front side configured to face the transom, a back side opposite the front side, a left side, and an opposite right side. An engine having an engine block is mounted directly to and supported by the midsection housing. A driveshaft is coupled in torque transmitting relation with a crankshaft of the engine, and a portion of the driveshaft is located exterior to the midsection housing. An exhaust pipe that conveys exhaust gas from an exhaust gas outlet of the engine downwardly away from the engine is also located exterior to the midsection housing. In one example, the midsection housing serves as a sump for engine oil.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain non-limiting examples, a marine drive such as an outboard motor comprises a propulsion unit, a supporting cradle that couples the propulsion unit to a pedestal and transom bracket assembly for attachment to a marine vessel, a resilient mount that couples the propulsion unit to the supporting cradle such that the propulsion unit can move with respect to the supporting cradle, a sound blocking member that extends across an internal gap between the propulsion unit and the supporting cradle, and a cowling system having upper and lower cowlings that cover at least a portion of the propulsion unit and lower cradle covers that covers at least a portion of the supporting cradle. The upper and lower cowlings are separated from the lower cradle covers by an external gap so that the upper and lower cowlings can move along with the propulsion unit and with respect to the supporting cradle and the lower cradle covers. The sound blocking member blocks the sound which otherwise would emanate from propulsion unit via the internal gap and then from the marine drive via the external gap.

DETAILED DESCRIPTION OF THE DRAWINGS

Figure 1:
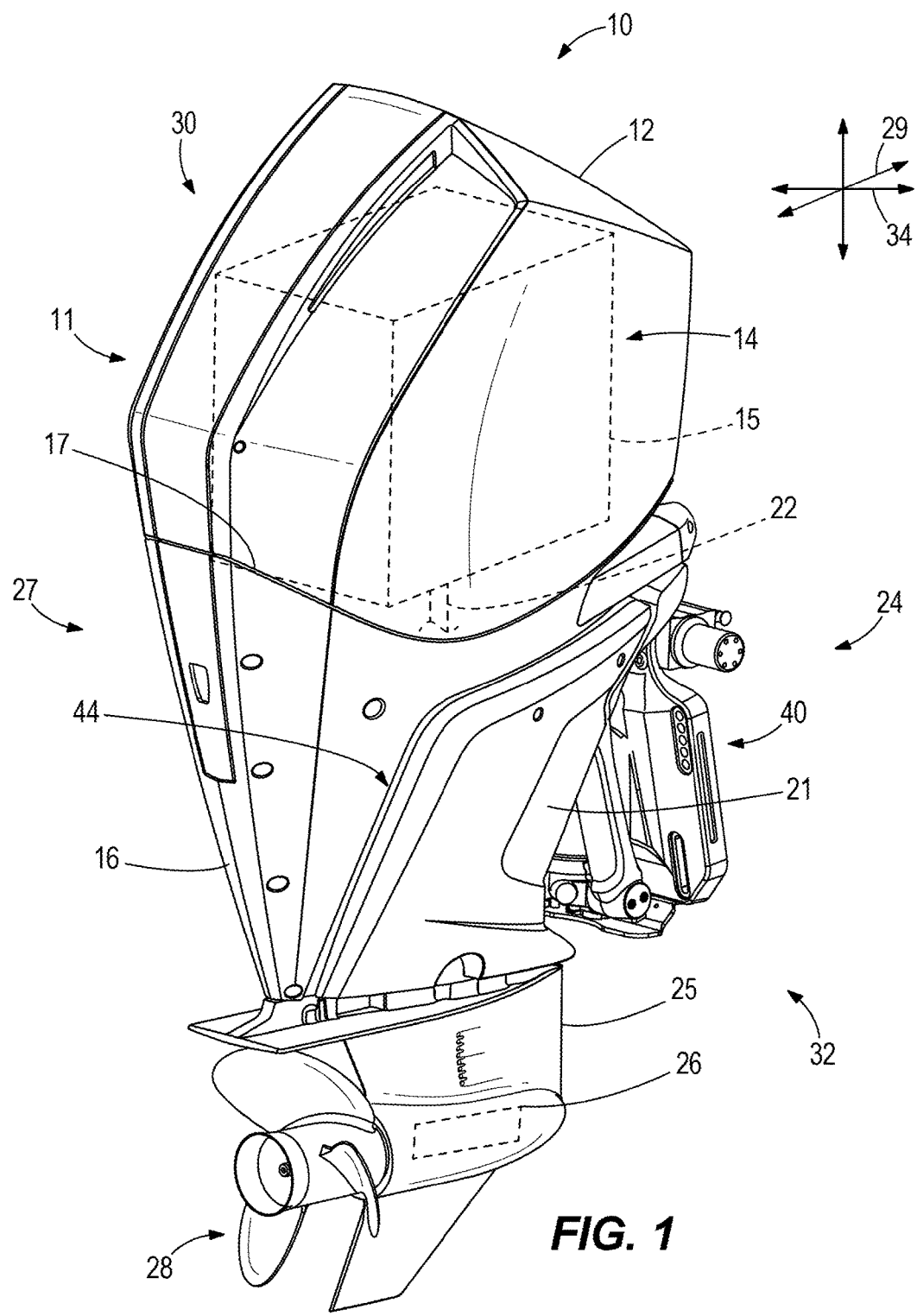
FIG. 1 is a perspective view of an outboard motor having a cowling system with an upper cowling that covers at least a portion of the propulsion unit, a lower cowling that covers a portion of the propulsion unit, and cradle covers that cover a portion of a supporting cradle.

FIG. 1 depicts a marine drive, which in this example is an outboard motor 10 having a cowling system 11 including an upper cowling 12 that covers a propulsion unit 14 including for example an internal combustion engine 15, and a lower cowling 16 that covers other components of the propulsion unit 14 including for example the aftward side of a driveshaft housing 20 (FIG. 2), which will be further explained herein below with reference to FIGS. 2-7. As is conventional, the propulsion unit 14 also includes a driveshaft 22 that extends from the internal combustion engine 15 through the driveshaft housing 20 and is coupled at its lower end to a transmission gearset 26 located in a lower gearcase 25. The cowling system 11 further includes a pair of lower cradle covers 21 that are attached to the supporting cradle 38 and that cover port and starboard portions of a supporting cradle 38 (FIG. 2), which will be further explained herein below with reference to FIGS. 2-7. Operation of the internal combustion engine 15 causes rotation of the driveshaft 22, which powers a propulsor 28 that is operably connected to the driveshaft 22 by the transmission gearset 26, all as is conventional. In the illustrated example, the propulsor 28 includes a propeller. The type and configuration of the marine drive shown in the figures is for explanatory purposes only and can vary from what is shown.

As shown in FIG. 1, the upper cowling 12 is mated with the lower cowling 16 along a seam 17 and can be removed from the lower cowling 16 for access to the internal combustion engine 15. The upper and lower cowlings 12, 16 are separated from the lower cradle covers 21 by an external gap 44. The external gap 44 extends around the entire perimeter of the outboard motor 10 and is configured so that the upper and lower cowlings 12, 16 can move (e.g., vibrate, deflect, translate) with respect to the lower cradle covers 21, as will be further explained herein below. In general, the outboard motor 10 extends between a forward side 24 and an aftward side 27 along a fore-aft axis 29, and between a port side 30 and a starboard side 32 along a port-starboard axis 34 that is perpendicular to the fore-aft axis 29.

Figure 2:
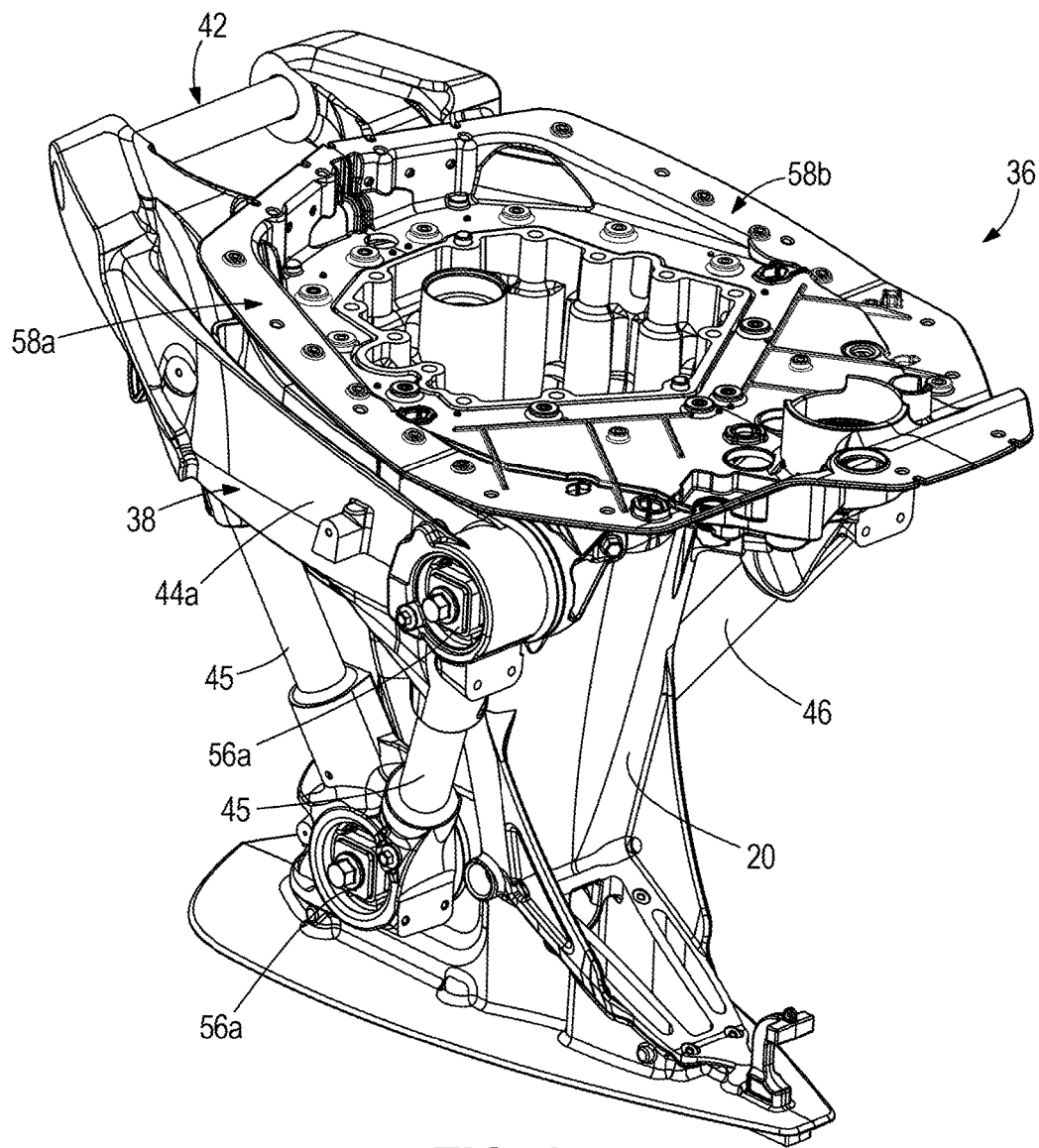
FIG. 2 is a rear perspective view looking down at portions of the outboard motor, including the supporting cradle, a driveshaft housing, and chap plates for coupling the cowling system to the driveshaft housing.
Figure 3:
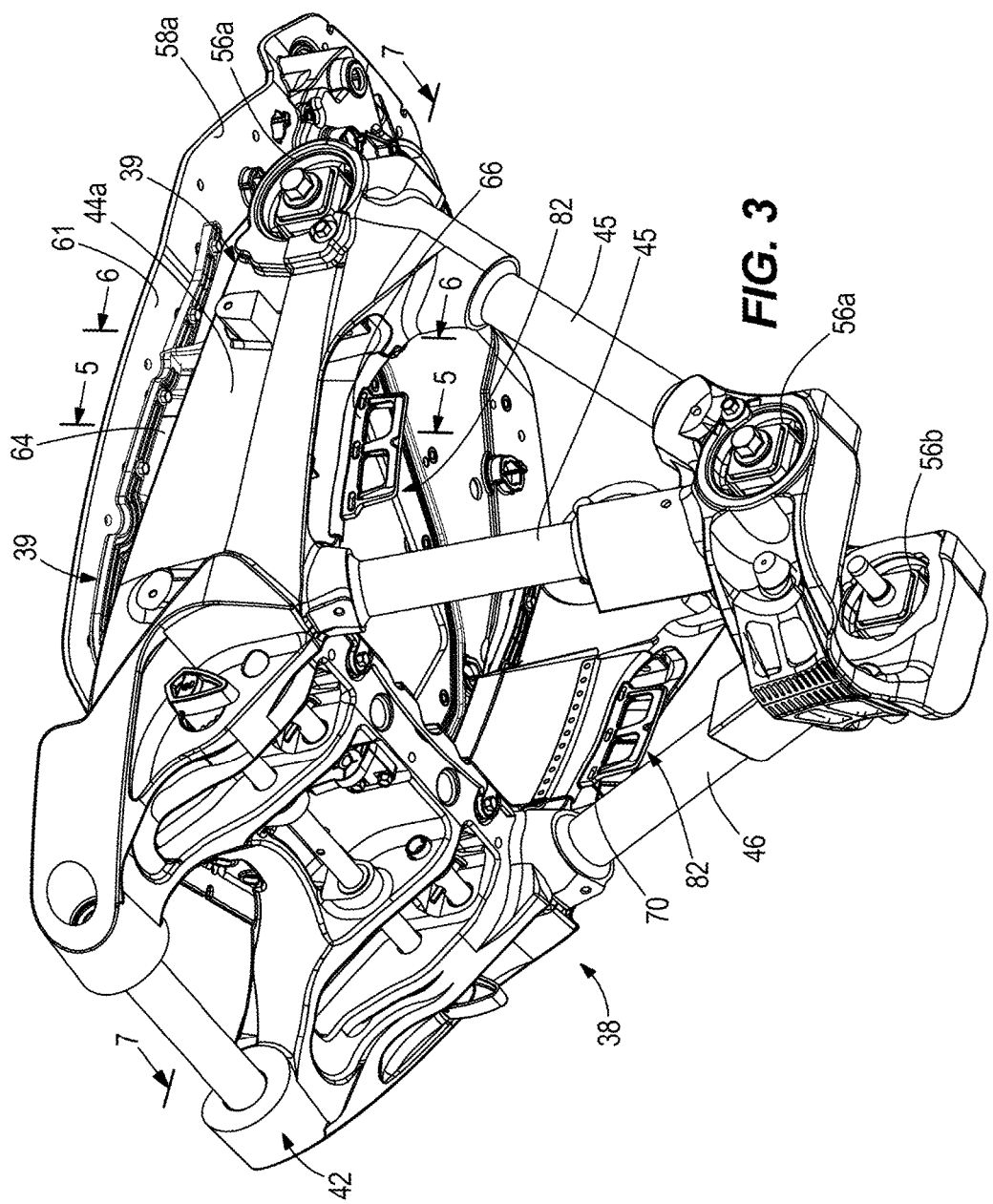
FIG. 3 is a port side perspective view looking up at the supporting cradle and chap plates.

FIG. 2 depicts a midsection 36 of the outboard motor 10. The midsection 36 includes the aforementioned supporting cradle 38 that couples the propulsion unit 14 to a marine vessel via, for example, a pedestal 40 (FIG. 1) and an associated conventional transom bracket assembly (not shown). The supporting cradle 38 has a head section 42 for rigid attachment to the pedestal 40 and associated transom bracket assembly, and port and starboard supporting arms 44a, 44b (see FIG. 4) that extend aftwardly from the head section 42 along the port and starboard sides 30, 32 (see FIG. 1) of the outboard motor 10. The supporting cradle 38 further includes angled, rigid port and starboard supporting columns 45, 46 which have upper ends connected to opposite ends of the respective supporting arms 44a, 44b and lower ends that are coupled together. Port and starboard resilient (i.e., flexible) mounts 56a, 56b (see FIG. 4) are supported in the supporting cradle 38 and extend with respect to the port-starboard axis 34 into engagement with the driveshaft housing 20 to thereby resiliently couple the port and starboard supporting arms 44a, 44b and rigid supporting columns 45, 46 to the propulsion unit 14 via the noted driveshaft housing 20, which extends below the internal combustion engine 15 through a center of the supporting cradle 38. Port and starboard adapter plates or chap plates 58a, 58b underlie and support the cowling system 11 and couple the cowling system 11 to the driveshaft housing 20. The type and configuration of the supporting cradle 38 can vary from that which is shown. Various types and configurations of suitable supporting cradles are disclosed in U.S. Pat. Nos. 9,373,191 and 9,701,383. Additional examples of suitable supporting cradles are disclosed in co-pending U.S. patent application Ser. Nos. 15/410,879 and 15/410,893. The type and configuration of resilient mounts 56a, 56b can also vary from what is shown. Additional examples of suitable resilient mounts are disclosed in the above-incorporated U.S. patents and patent applications. The type and configuration of the adapter plates or chap plates 58a, 58b can also vary from what is shown and suitable examples are provided in the above-incorporated U.S. patents and applications.

As described in the above-incorporated patents and patent applications, the supporting cradle 38 is rigidly connected to the marine vessel via the noted pedestal 40 and an associated transom bracket assembly. Thus, the supporting cradle 38, pedestal 40 and transom bracket assembly, lower gearcase 25 and lower cradle covers 21 together generally form a "static portion" of the outboard motor 10. The propulsion unit 14, including the internal combustion engine 15, driveshaft housing 20, driveshaft 22, and port and starboard adapter plates or chap plates 58a, 58b are resiliently mounted to the supporting cradle 38 via the resilient mounts 56a, 56b and are separated from the static portion of the outboard motor 10 by an internal gap 39 (see FIGS. 3 and 5). More specifically the internal gap 39 exists vertically between the supporting cradle 38 and the lower surfaces of the chap plates 58a, 58b and laterally with respect to the fore-aft axis 29 and port-starboard axis 34 between the supporting cradle 38 and the driveshaft housing 20. As described in the above-incorporated U.S. patents and patent applications, the resilient mounts 56a, 56b allow the propulsion unit 14 (including the internal combustion engine 15, chap plates 58a, 58b, and driveshaft housing 20) to move (e.g., vibrate, deflect, translate) towards and away from the static portion, which affects (changes) the size of the internal gap 39. Thus the propulsion unit 14 forms part of a "dynamic portion" of the outboard motor 10. As shown in dashed lines in FIG. 7, the dynamic portion of the outboard motor 10 is able to move (e.g., vibrate, deflect, translate) with respect to the static portion of the outboard motor 10 or propulsive forces generated by the propulsor 28. For example, the internal combustion engine 15 typically will vibrate with respect to the supporting cradle 38 during normal operating conditions. Lateral deflection of the propulsion unit 14 can also occur due to external forces (e.g. waves) impacting the outboard motor 10. These movements are taken up (i.e., absorbed, dampened) by the resilient mounts 56a, 56b and thus minimized before, if at all, being passed to the associated marine vessel via the supporting cradle 38 and pedestal 40/transom bracket assembly, all as is conventional.

Referring back to FIGS. 1 and 2, the upper cowling 12 generally covers the propulsion unit 14 and is part of the dynamic portion of the outboard motor 10. The lower cowling 16 generally covers the aftward side of the midsection 36, and is also part of the dynamic portion of the outboard motor 10. The upper cowling 12 and the lower cowling 16 are separated from the lower cradle covers 21 by the external gap 44. During operation, the upper and lower cowlings 12, 16 can deflect along with the rest of the dynamic portion of the outboard motor 10 and relative to the static portion of the outboard motor 10, including the lower cradle covers 21. The external gap 44 accommodates such movement so that the cowling system 11 does not impact or otherwise damage the lower cradle covers 21 during such movement.

During research and experimentation, the present inventors have determined that the external gap 44 provides a pathway for sound emanating from the outboard motor 10. That is, prior outboard motor arrangements typically have a closed interior, defined by one continuous cowling or multiple cowling portions that are sealed with respect to each other, which retains sound emanating from the propulsion unit 14. However, unlike the prior art, the outboard motor 10 shown in FIG. 1 includes the external gap 44 which extends around the perimeter of the outboard motor 10 and facilitates movement of the upper cowling 12 and lower cowling 16 with respect to the lower cradle covers 21. The external gap 44 disadvantageously facilitates transmission of sound from the propulsion unit 14 to outside of the cowling system 11 and can be particularly disturbing to those people near the outboard motor 10, for example occupants of the marine vessel. The present inventors have realized that this is a problem because in most situations it is desirable to maintain quiet operation of outboard motors. The present disclosure provides solutions to this problem.

Figure 4:
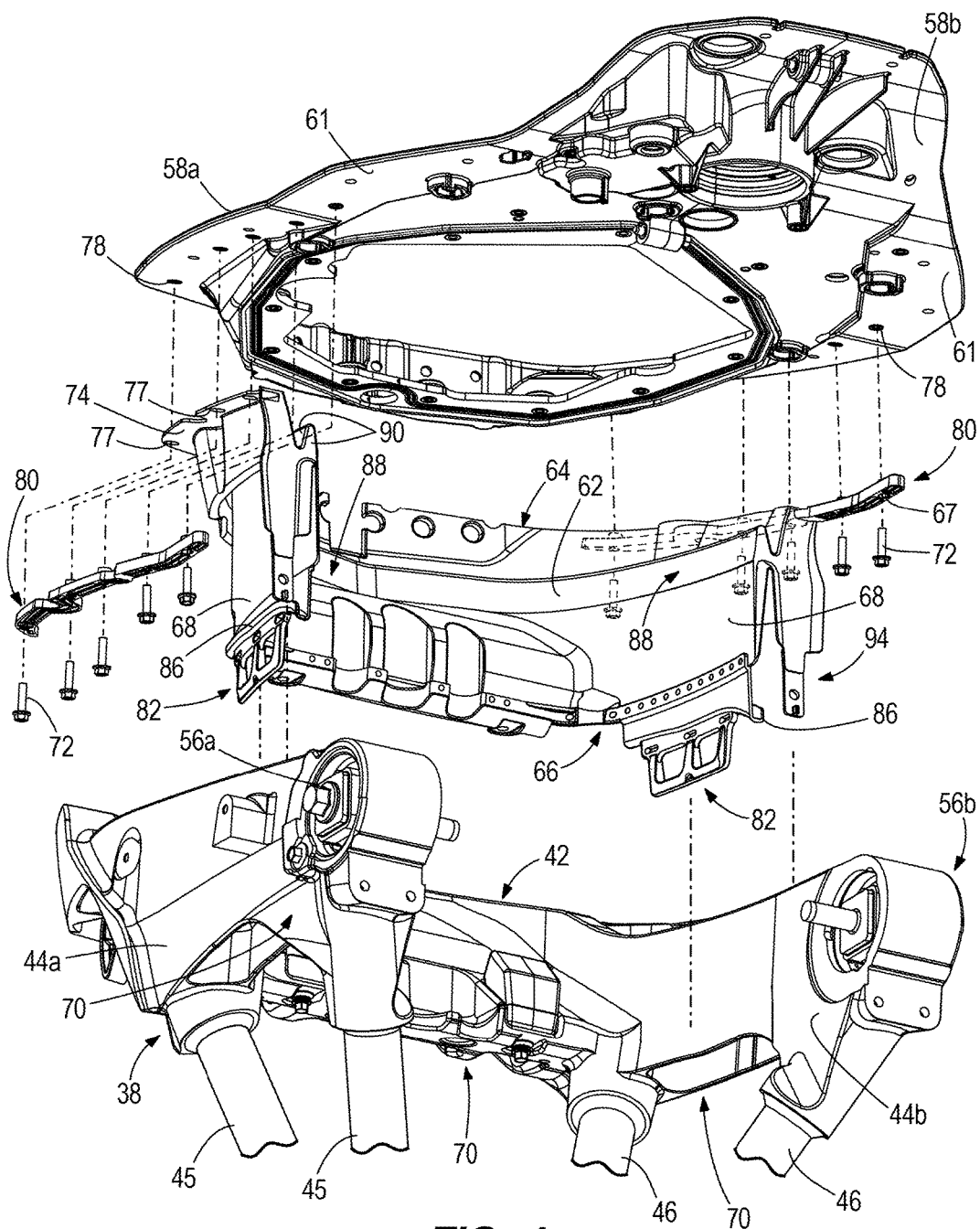
FIG. 4 is a port side exploded view looking up at the supporting cradle and chap plates, and showing one example of a sound blocking member according to the present disclosure.
Figure 5:
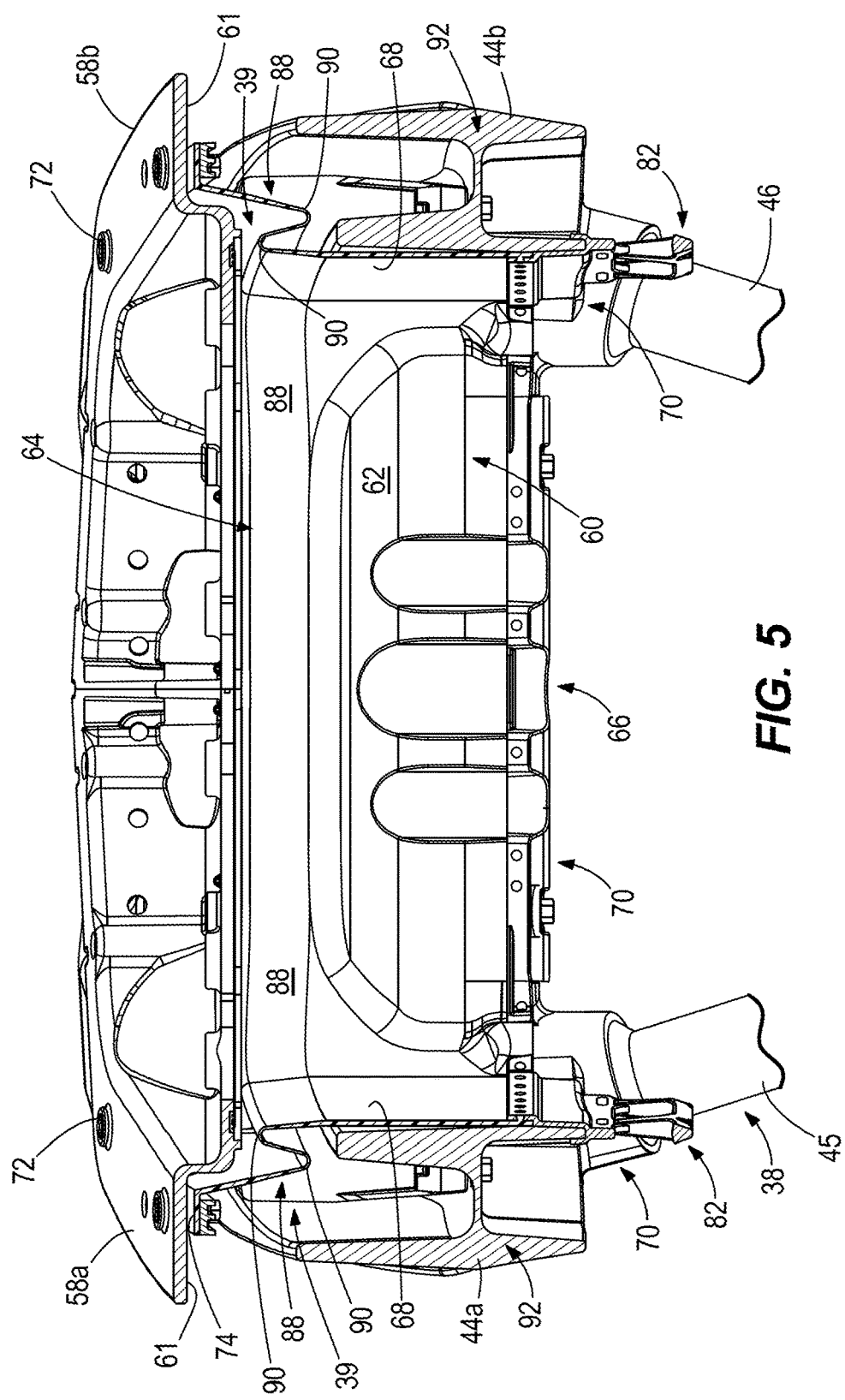
FIG. 5 is a view of Section 5-5 taken in FIG. 3.
Figure 6:
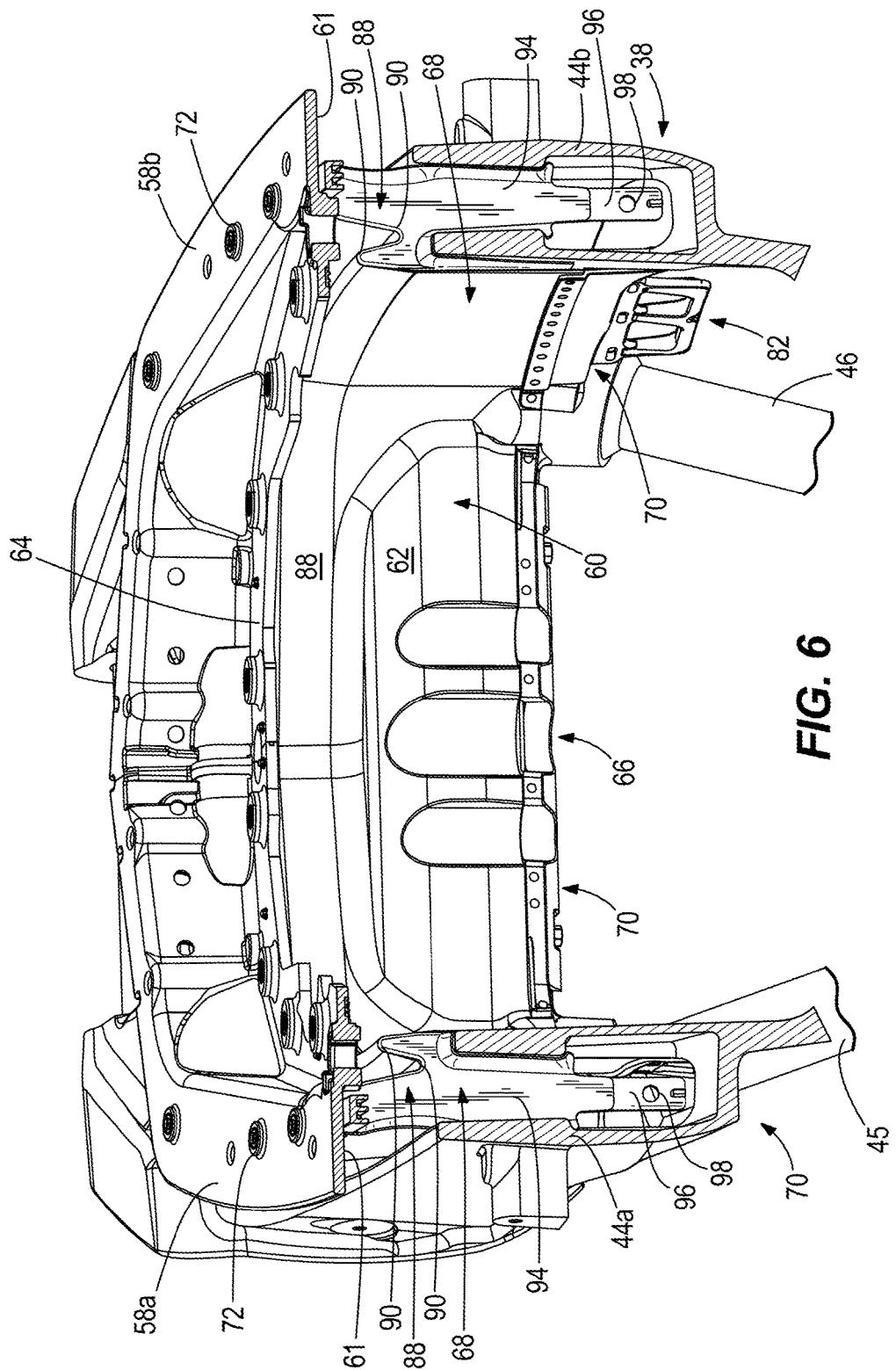
FIG. 6 is a view of Section 6-6, taken in FIG. 3.

Referring to now FIGS. 4-6, according to the present disclosure, the outboard motor 10 includes a sound blocking member 60 configured to block sound that otherwise would emanate from the propulsion unit 14 via the internal gap 39 between the propulsion unit 14 and the supporting cradle 38 and consequently via the external gap 44 in the cowling system 11. The sound blocking member 60 includes a body 62 having an upper portion 64 coupled to the propulsion unit 14 via the chap plates 58a, 58b and a lower portion 66 coupled to the supporting cradle 38. The sound blocking member 60 has sidewalls 68 that extend between the upper portion 64 and lower portion 66. As shown in FIGS. 5 and 6, the sidewalls 68 are disposed radially inside of the supporting cradle 38 and the lower portion 66 of the sidewalls 68 is coupled to an underside 70 of the supporting cradle 38 along the head section 42 and along the supporting arms 44a, 44b. The sound blocking member 60 generally has a U-shape including the sidewalls 68 that extend along the port and starboard sides 30, 32 of the outboard motor, and along the forward side 24 of the outboard motor 10. In a preferred example, the sound blocking member 60 is made of a thermoplastic elastomer having a limited amount of flexibility and configured to dampen the sound that emanates from the propulsion unit 14.

Referring to FIG. 4, the sound blocking member 60 is attached to the lower surfaces 61 of the chap plates 58a, 58b via fasteners 72. In particular, the sound blocking member 60 has a radially outwardly projecting flange 74 having through-holes 77 through which the fasteners 72 are inserted. Corresponding through-holes 78 on the lower surfaces 61 of the chap plates 58a, 58b receive the fasteners 72 to thereby fasten the upper portion 64 of the sound blocking member 60 to the chap plates 58a, 58b. A rigid supporting bracket 80 supports the flange 74 on the lower surfaces 61 of the chap plates 58a, 58b and includes through-holes 67 through which the fasteners 72 are inserted during installation.

The sound blocking member 60 further has a pair of pull-handles 82 that extend downwardly from the lower portion 66 of the sidewalls 68 and are configured for manual grasping and pulling downwardly by an operator during installation of the lower portion 66 onto the underside 70 of the supporting cradle 38. More particularly, the upper portion 64 of the sound blocking member 60 is first fastened to the underside of the chap plates 58a, 58b, as described herein above. Thereafter, the chap plates 58a, 58b are lowered onto the supporting arms 44a, 44b so that the sidewalls 68 of the sound block member 60 are located into the interior of the supporting cradle 38 and more particularly draped across the noted internal gap 39 between the propulsion unit 14 and the supporting cradle 38. Thereafter, the installer manually grasps the pull-handles 82. The installer pulls downwardly on the pull-handles 82 and radially outwardly moves the sidewalls 68 so that a supporting hook 86 on the lower portion 66 is disposed beneath the supporting arms 44a, 44b in a preloaded fit. Optionally, fasteners can be added to firmly fix the supporting hook 86 to the underside 70 of the supporting cradle 38.

The sidewalls 68 of the sound blocking member 60 have a bellows portion 88 that allows the sound blocking member 60 to flex during installation and also subsequently upon movement of the propulsion unit 14 relative to the supporting cradle 38. The bellows portion 88 includes a plurality of folds 90 in the sidewalls 68. The folds 90 extend along port and starboard sides 30, 32 of the outboard motor 10. The folds 90 further extend along the forward side 24 of the outboard motor 10. The bellows portion 88 is located below the upper portion 64 of the sidewalls 68 and above the lower portion 66 of the sidewalls 68 and extend radially (see FIG. 5) so that the upper portion 64 of the sidewalls 68 is located radially outwardly of the lower portion 66 of the sidewalls 68.

Referring to FIG. 5, the port and starboard supporting arms 44a, 44b have an H-shaped profile 92 when viewed in cross-section. Referring to FIG. 6, the sound blocking member 60 comprises downwardly extending ears 94 that extend into a top of the H-shaped profile 92 and block sound emanating from the propulsion unit 14 via the H-shaped profile 92. Attachment ends 96 on the ears 94 have through-holes 98 through which a fastener can be installed to fasten the attachment ears 94 to an inner surface of the H-shaped profile.

Figure 7:
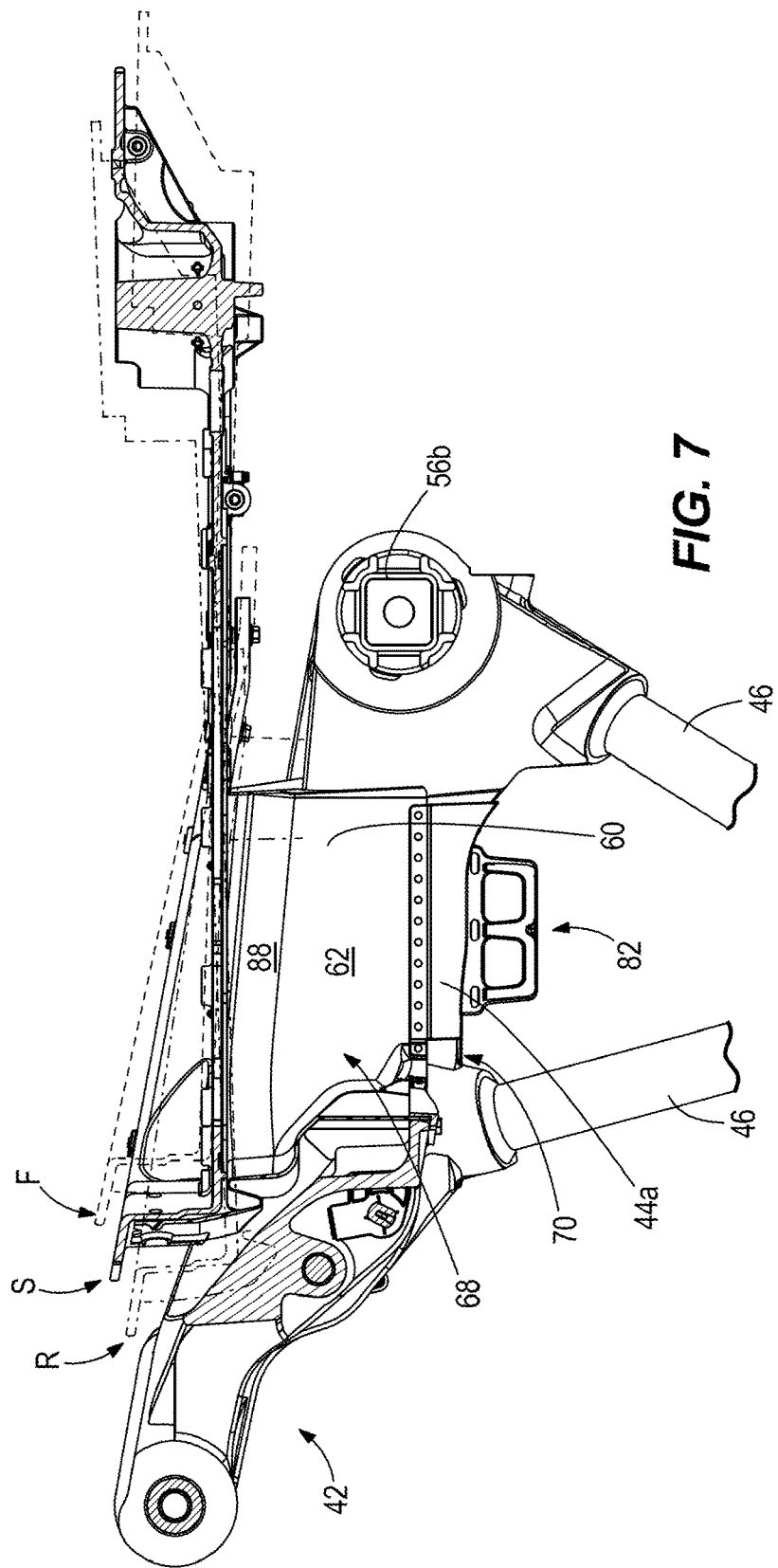
FIG. 7 is a view of Section 7-7, taken in FIG. 3, showing movement (deflection) of the chap plates with respect to the supporting cradle.

FIG. 7 depicts the chap plates 58a, 58b during operations of the outboard motor 10 in reverse thrust (see R), stationary (see S), and forward thrust (see F). Additional movements are possible and not shown, for example relative twisting with respect to vertical. Advantageously, the sound blocking member 60 provides a flexible membrane that is connected to both the dynamic and static portions of the outboard motor 10. The sound blocking member 60 extends across the internal gap 39 between the propulsion unit 14 and the supporting cradle 38 so as to seal off noises emanating from the driveshaft housing 20 via the internal gap 39 and external gap 44 regardless of motions of the propulsion unit 14 with respect to the supporting cradle 38.

In the present description, certain terms have been used for brevity, clearness and understanding. No unnecessary limitations are to be implied therefrom beyond the requirement of the prior art because such terms are used for descriptive purposes only and are intended to be broadly construed. The different systems, methods and apparatuses described herein may be used alone or in combination with other systems, methods and apparatuses. Various equivalents, alternatives and modifications are possible within the scope of the appended claims.

What is claimed is:

1. A marine drive comprising:
   a propulsion unit;
   a supporting cradle that couples the propulsion unit to a pedestal for attachment to a marine vessel;
   a resilient mount that couples the propulsion unit to the supporting cradle such that the propulsion unit can move with respect to the supporting cradle; and
   a sound blocking member that extends across an internal gap between the propulsion unit and the supporting cradle and blocks sound that otherwise would emanate from the propulsion unit via the internal gap.

2. The marine drive according to claim 1, further comprising a cowling system having upper and lower cowlings that cover at least a portion of the propulsion unit and a lower cradle cover that covers at least a portion of the supporting cradle; wherein the upper and lower cowlings are separated from the lower cradle cover by an external gap so that the upper and lower cowlings can move along with the propulsion unit and with respect to the supporting cradle and the lower cradle cover, and wherein the sound blocking member blocks the sound which otherwise would emanate from propulsion unit via the internal gap and then from the marine drive via the external gap.

3. The marine drive according to claim 1, wherein the marine drive extends between a forward side and an aftward side along a fore-aft axis, and between a port side and a starboard side along a port-starboard axis that is perpendicular to the fore-aft axis, wherein the internal gap extends along the forward side of the marine drive, and wherein the sound blocking member blocks the sound emanating via from the internal gap towards the pedestal and marine vessel.

4. The marine drive according to claim 1, wherein the sound blocking member has an upper portion coupled to the propulsion unit and a lower portion coupled to the supporting cradle.

5. The marine drive according to claim 4, wherein the sound blocking member has sidewalls that vertically extend between the upper portion and the lower portion and across the internal gap.

6. The marine drive according to claim 5, wherein the sidewalls are at least partially disposed inside the cradle.

7. The marine drive according to claim 5, wherein the lower portion of the sound blocking member is coupled to an underside of the cradle.

8. The marine drive according to claim 7, further comprising at least one pull handle extending downwardly from the lower portion of the sound blocking member and configured for manual pulling by an operator to pull the lower portion of the sound blocking member downwardly across the gap and onto the underside of the supporting cradle.

9. The marine drive according to claim 5, wherein the sidewalls comprise a bellows portion that allows the sound blocking member to flex during movement of the propulsion unit with respect to the supporting cradle.

10. The marine drive according to claim 9, wherein the bellows portion comprises a plurality of folds that extend along port and starboard sides of the marine drive.

11. The marine drive according to claim 10, wherein the plurality of folds further extends along a forward side of the marine drive.

12. The marine drive according to claim 9, wherein the bellows portion is located between the upper and lower portions of the sound blocking member and extends radially so that the upper portion of the sound blocking member is located radially outwardly of the lower portion of the sound blocking member.

13. The marine drive according to claim 1, wherein the marine drive extends between a forward side and an aftward side along a fore-aft axis, and between a port side and a starboard side along a port-starboard axis that is perpendicular to the fore-aft axis, wherein the supporting cradle has a head section for coupling to the pedestal, wherein the supporting cradle further has port and starboard supporting arms that aftwardly extend from the head section along the port and starboard sides, respectively, and wherein the resilient mount is one of port and starboard mounts that resiliently mount the port and starboard supporting arms to the propulsion unit.

14. The marine drive according to claim 13, wherein the propulsion unit comprises an internal combustion engine, a driveshaft housing that extends below the internal combustion engine through the cradle, and chap plates that couple a cowling system on the marine drive to the driveshaft housing, and wherein the sound blocking member has an upper portion coupled to the chap plates and a lower portion coupled to the cradle.

15. The marine drive according to claim 13, wherein the port and starboard supporting arms have an H-shaped profile when viewed in cross-section, and wherein the sound blocking member comprises downwardly extending ears that extend into a top of the H-shaped profile and that block sound emanating from the propulsion unit via the H-shaped profile.

16. The marine drive according to claim 13, wherein the sound blocking member has a U-shape that extends along the port and starboard sides of the marine drive and also along the front of the marine drive.

17. The marine drive according to claim 1, wherein the sound blocking member is comprised of a thermoplastic elastomer.

18. An outboard motor comprising:
  a propulsion unit;
  a supporting cradle that couples the propulsion unit to a pedestal for attachment to a marine vessel;
  a resilient mount that couples the propulsion unit to the supporting cradle such that the propulsion unit can move with respect to the supporting cradle;
  a sound blocking member that extends across an internal gap between the propulsion unit and the supporting cradle; and
  a cowling system having a cowling that covers at least a portion of the propulsion unit and a lower cradle cover that covers at least a portion of the supporting cradle;
  wherein the cowling is separated from the lower cradle cover by an external gap so that the cowling can move along with the propulsion unit and with respect to the supporting cradle and the lower cradle cover, and wherein the sound blocking member blocks the sound which otherwise would emanate from propulsion unit via the internal gap and then from the marine drive via the external gap.

19. The outboard motor according to claim 18, wherein the propulsion unit comprises an internal combustion engine, a driveshaft housing that extends below the internal combustion engine through the cradle, and chap plates that couple a cowling system on the marine drive internal combustion engine to the driveshaft housing, and wherein the sound blocking member has an upper portion coupled to the chap plates and a lower portion coupled to the cradle.

20. The outboard motor according to claim 19, wherein the supporting cradle has a head section for coupling to the pedestal, wherein the supporting cradle further has port and starboard supporting arms that extend aftwardly from the head section, wherein the resilient mount is one of port and starboard mounts that resiliently mount the port and starboard supporting arms to the propulsion unit, and wherein the sound blocking member extends along the head section and along the port and starboard arms.

* * * * *